Jan. 3, 1961 E. J. PALCZEWSKI 2,966,845
DEVICE FOR MARKING CYLINDRICAL CONTAINERS AND ATTACHMENT
THEREFOR FOR MARKING NON-CYLINDRICAL CONTAINERS
Filed April 1, 1954 6 Sheets-Sheet 1

Fig. 1

INVENTOR
EDWARD J. PALCZEWSKI

BY
ATTORNEY

Jan. 3, 1961 E. J. PALCZEWSKI 2,966,845
DEVICE FOR MARKING CYLINDRICAL CONTAINERS AND ATTACHMENT
THEREFOR FOR MARKING NON-CYLINDRICAL CONTAINERS
Filed April 1, 1954 6 Sheets-Sheet 3

INVENTOR
EDWARD J. PALCZEWSKI

BY

ATTORNEY

Jan. 3, 1961  E. J. PALCZEWSKI  2,966,845
DEVICE FOR MARKING CYLINDRICAL CONTAINERS AND ATTACHMENT
THEREFOR FOR MARKING NON-CYLINDRICAL CONTAINERS
Filed April 1, 1954  6 Sheets-Sheet 5

INVENTOR
EDWARD J. PALCZEWSKI
BY L. P. Harvey
ATTORNEY

Jan. 3, 1961 E. J. PALCZEWSKI 2,966,845
DEVICE FOR MARKING CYLINDRICAL CONTAINERS AND ATTACHMENT
THEREFOR FOR MARKING NON-CYLINDRICAL CONTAINERS
Filed April 1, 1954 6 Sheets-Sheet 6

INVENTOR
Edward J. Palczewski,
BY
L. P. Harvey
ATTORNEY

United States Patent Office 2,966,845
Patented Jan. 3, 1961

2,966,845

DEVICE FOR MARKING CYLINDRICAL CONTAINERS AND ATTACHMENT THEREFOR FOR MARKING NON-CYLINDRICAL CONTAINERS

Edward J. Palczewski, 4929 Penn St., Philadelphia, Pa.

Filed Apr. 1, 1954, Ser. No. 420,227

19 Claims. (Cl. 101—126)

This application is a continuation-in-part of my copending application for patent on a Device for Marking Cylindrical Containers, Ser. No. 366,583, filed July 7, 1953, now U.S. Patent No. 2,713,821. The instant application is intended to cover an attachment, which can be removably applied to the apparatus disclosed in the first case, just mentioned, to enlarge the scope of the machine so that containers, preferably but not necessarily rectangular in cross section, can be marked by the operation of the original machine when modified by having the attachment added thereto. It is intended to cover in this application not only the attachment per se but also the combination it forms with the machine in question.

The attachment may be described in general terms as made up of an upper frame, suspension devices, and a lower frame or platform connected to the upper frame by said suspension devices. The upper frame is made up of channel members or clamps constructed to embrace the channeled supports, in which the silk screen is slidably and removably received. Said frame also includes stringers secured to said channel members. From the stringers expansible chamber devices extend downwardly and plungers project from the latter and are secured to a platform for floating the latter. The expansible chamber devices and plungers constitute the suspension devices.

The platform is formed to provide guide channels, through which each set of containers to be marked is moved by a pusher member from the container receiving part of the attachment into alignment with regions of the silk screen, through which the marking medium can be forced by the squeegee. Each set, after the containers thereof have been marked, is then moved onward through the channels of the attachment by the next set to be marked as a result of the operation of the pusher member. The cans that have been marked may be manually removed from the attachment by an attendant working at the exit ends of the channels or they may be deposited on a conveyor as a new set of unmarked cans is deposited on the platform by an attendant or a conveyor at the container receiving portions of the attachment. After the pusher member is operated to place a new set of cans in position to be marked, a plunger in the preferred form of the invention is pushed into its inmost position in the body of a control member carrying the plunger and a new cycle of operation involving the marking of such set is initiated.

The structure, by means of which the above described operations are carried out, will now be described, reference being had to the drawings to aid in the understanding of the invention.

Fig. 4 is a side view showing the squeegee carriage.

Fig. 5 is a top plan of certain features of the machine which cooperate directly with one another. It is restricted to a showing of the drum conveying carriage, the tracks along which the latter moves, and the racks at the drum receiving and drum discharge stations at the opposite ends of the tracks. A showing of the end frames supporting the tracks and of the pneumatically mechanism for moving the squeegee and the drum conveying carriages has been omitted for the sake of clearness.

Fig. 6 is a detail view showing the drum receiving end of a machine, in which the drum conveying carriage is moved by mechanism operated by fluid under pressure. The figure additionally discloses details of the drum conveying carriage.

Fig. 7 is an end view of the drum conveying carriage and of the tracks along which it moves.

The structure for operating the platform has been omitted from Fig. 11 and parts of said structure have been omitted from Figs. 12, 13 and 14.

Fig. 16 is a view showing how the set of suspension devices are connected to the air supply and the hollow members of the set are connected one to another.

In order that an understanding of the relation of this case to said copending application, Ser. No. 366,583, filed July 7, 1953, now U.S. Patent No. 2,713,821, may be expedited, the use of reference characters applied to the several parts shown in the first case, which are reproduced in this application, will be repeated.

Referring to Figs. 1 to 6 inclusive, it will be seen that the machine, on which the attachment is to be used, is made up of a framework, a silk screen carried by the framework, a squeegee and its carriage carried by the framework, a drum conveying carriage and means for causing the carriages to move in unison in the same direction.

The framework F is made up of an end frame F1 located at the drum receiving end of the framework and a second frame F2 at the discharge end of the latter. Said frames are connected by two pairs 10 and 20 of channel members and a pair 30 of angle members, all of which members are suitably secured to said frames. In order to rigidify the structure, said frames may be connected at the bottom thereof by a pair 40 of members.

Figures 2, 2A:
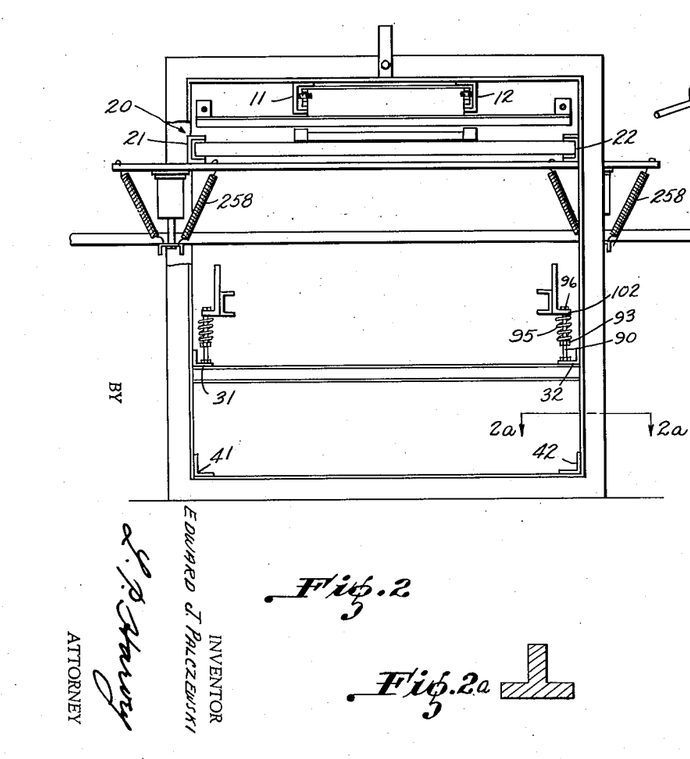
Fig. 2 is an end view of the structure shown in Fig. 1, but with the drum conveying carriage omitted.
Fig. 2a is a sectional view of one of the uprights of a frame member and is taken on the line 2a—2a of Fig. 2.

Pair 10 of channel members consists, as shown in Fig. 2, of elements 11 and 12, each of which is suitably secured to the upper crosspieces of frames F1, F2. The channels of these elements open toward the longitudinal center of the framework.

The pair 20 of channel members consists of elements 21, 22, each of which is suitably secured to the uprights of the frames F1, F2. Each channel opens toward the longitudinal center of the framework.

The angle members 31, 32 of the pair 30 have each a vertical flange secured to an upright portion of the frames F1, F2, while the horizontal portions of said members extend inwardly toward the longitudinal center of the framework.

The pair 40 of elements 41, 42 connects the lower portions of frames F1, F2, and may be merely long enough to perform this function or said elements may curve upwardly beyond frame F2 to form a trackway to return drums, after they are marked, to the receiving end of the machine. This last mentioned arrangement permits the same operator to feed drums to be marked into the machine and recover, at his end of the machine, the same drums after their passage therethrough.

The squeegee structure, as shown on the drawings, is for the most part identical with that shown in Figs. 4 through 7 of my copending application, hereinbefore mentioned. However, it is not essential to the operation of the invention herein disclosed that the squeegee structures be the same. In fact, this application discloses some additional elements added to the first squeegee structure.

Referring to the drawing it will be seen that the squeegee structure comprises a carriage 50, made up of a top plate 51, from which the spaced apart lugs 52 project upwardly. Members 53 depend, one from each side of plate 51, and carry rollers 54 mounted to engage the vertical webs of channel members 11, 12, and said members 53 also carry rollers 55, mounted to run on the lower flanges of said channel members. Wall member 56, carried by plate 51, has hinged thereto, at 57, a second plate 58. Springs 59 are connected to plates 51, 58 and urge the latter to swing toward the former.

A bifurcated member 60 is pivotally connected by means of a cross pin 61 to lugs 52. One member of a linkage system is pivotally connected, through cross pin 62 to the tines 63 of member 60. A bolt 64 extends upwardly through an opening in plate 51 and has threaded thereon a thumbnut 65. A spring 66 is compressed between said thumbnut and the tines 63 of member 60. If desired a washer may bridge the space between said tines and engage the lower end of said spring.

Threaded studs 67 project toward each other from triangular members 68, depending from the undersurface of plate 51 along the longitudinal center thereof. These studs form adjustable abutments for the linkage made up of members 70 and 71, the upper link 70 extending downwardly through the slot in the bifurcated member and through an opening in plate 51 and being pivotally connected to link 71.

A bar 72 extends across plate 58 and beyond the side edges of the latter. Bolts 73 secure the ends of the bar to a slotted angle member 74. Adjustably carried by said angle member are a squeegee 78 and a pair of plates 77 and 79, between which the squeegee is arranged. A distributor plate 80, provided with perforations 81, is also adjustably carried by angle member 74, as shown on the drawing. Link 71 is pivotally secured at one end to the center of bar 72.

A trip structure 15 includes a bar having downturned ends 85 secured to the end frames F1, F2 and having its central portion 86 overlying the longitudinal center of the framework and adjustably carrying trip elements 87 in position to be engaged by the upper end of the link member 70.

The inwardly directed flanges of the members 31, 32 of the pair 30 carry adjacent each end an upwardly projecting, threaded rod 90, on which is threaded a nut 93. Each rod extends through an outwardly directed flange 102 of a track member and the upper portion of each rod extends through a spring 95, the lower end of which engages the associated nut 93 or a washer carried thereby. Nuts 96, threaded on the upper ends of the rods 90, prevent the springs from raising the track members above the upper ends of the rods.

Figure 1:
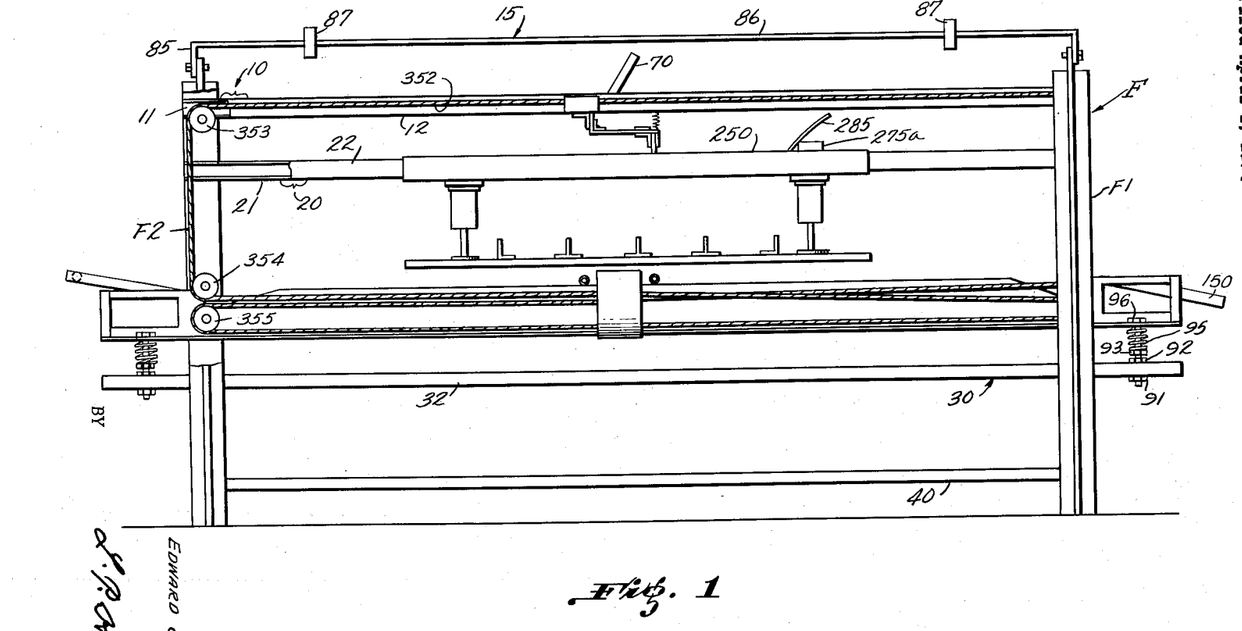
Fig. 1 is a side elevation, partly broken away, of the original machine, i.e., the machine shown in the co-pending application hereinbefore mentioned, but having the can marking attachment applied thereto. Part of the attachment has been omitted for the sake of clearness and the structure of the original machine is shown as modified in some details.
Figures 4, 5, 6, 7, 16:
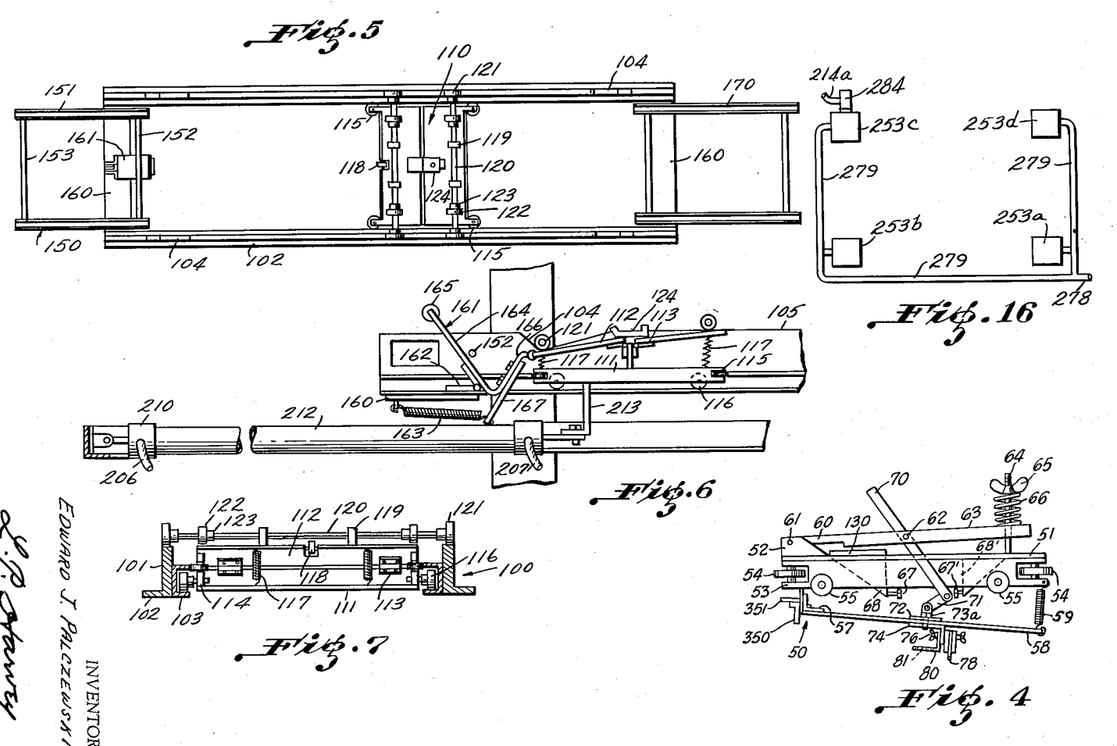

The floatingly supported track members 100, as shown in Figs. 1 and 7, comprise each a member 101, angular in cross section and having one of the outwardly directed flanges 102. A channel member 103 is rigidly secured to the inner face of each member 101 and provides a guide for rollers to be mentioned hereinafter. Each member 101 is cut away near its opposite ends to provide angular depressions 104. The top part 105 of each member 101 between such depressions is flat and extends substantially horizontally, except for such tilting of the tracks as is caused by the drums in their passage through the machine.

A drum conveying carriage 110, hereinafter called a drum carriage, reciprocates along the track members 100, between the depressions 104. The carriage includes a base member 111, to which two wing members 112 are secured by means of hinges 113. A strip 114 extends upwardly from the bottom plate of the base member 111 along each side edge of the plate. Each strip carries at its opposite ends rollers 115, which rotate on vertical axes and engage the upper edge of a channel member 103, although rollers engaging the inner faces of the webs of the channel members may replace the rollers just mentioned. Rollers 116 are also carried by strips 114 and ride on the lower flanges of the channel members 103. Springs 117 connected to the base member and the wings stress the latter to swing downwardly about the pintles of the hinges 113. A roller 118 is carried by front wing 112 at the front edge thereof.

Each wing member 112 has projecting from its upper face a pair of studs 119, in which is fixed a shaft 120. Rotatable on each end of each shaft is a roller 121 and between each stud 119 and a roller 121 is a roller 122 rotatable on its shaft but retained against shifting therealong by collars 123. The rear wing member 112 has secured thereto a kickoff member 124, part of which normally overlies the other wing member.

Projecting forwardly from frame F1 is a rack 150, made up of a pair of angle bars 151, which are adjustably secured, in any desired manner to a rod 152, secured to the floating track members. A cross piece 153 connects the free ends of the bars 151. The rack serves as a receiving station for the drums to be marked by the machine and is inclined downwardly from its free end toward frame F1.

As shown in Figs. 5 and 6, the front ends of the floating track members are connected by a plate 160, on which a bell crank member 161 is hinged at 162. A spring 163 urges the long arm 164 of the bell crank lever, which arm is provided with a roller 165, against the rod 152. A strip 167, secured to arm 166 of the bell crank, is connected to the spring at one end thereof, the other end of the spring being connected to plate 160. The upper end of the bell crank with its roller 165 is thus normally located in the path of movement of the drums on the rack.

A second rack 170, which extends downwardly and outwardly from the rear ends of the floating tracks, is otherwise similar to the first mentioned rack and forms the discharge station of the machine. A plate 160′, similar to the first mentioned plate 160, connects the rear ends of the floating tracks.

Assuming that a silk screen structure or a stencil structure, including a panel treated to provide the desired design, is mounted in the channel members 21, 22, and that drums to be marked are in place on the rack 150, and that the reciprocating carriages are close to the discharge end of the machine, the operator may push against either of the carriages and move both of them in unison toward the frame F1. Link 70 will be carried into engagement with the adjacent trip 87 and be swung about pivot 62, thus permitting the springs 59 to raise the squeegee clear of the silk screen or stencil panel before the permeable parts of the latter are passed over by the squeegee. Continued movement of the drum carriage finally results in rollers 121 of the foremost wing reaching the depressions 104 at the receiving end of the machine. The wing is then swung downwardly by the springs 117, which act on the wing, and the roller 118 engages the edge of arm 166 of the bell crank and permits the foremost drum on rack 150 to roll onto the drum carriage. This drum, owing to the proper proportioning of the parts of the machine with respect to the size of the drums, will prevent the next drums in the set from rolling off the rack onto the carriage. Movement of the carriage toward frame F2 will withdraw roller 118 from contact with the bell crank and permit roller 165 to swing into the path of travel of the drums on rack 150. Meanwhile movement of the squeegee carriage causes link 70 to engage the trip 87 nearest thereto and be swung about pivot 62 with the consequent depression of the squeegee 78 into contact with the silk screen or stencil panel. The floating tracks cause the drum passing through the machine to engage the frame portions of the silk screen or stencil structure and be rotated on rollers 122 and present new surface portions in succession to receive marking fluid extruded through panel of such structure by the squeegee.

In Figs. 11 and 12 of my parent application Ser. No. 366,583, now U.S. Patent No. 2,713,821, I show a system using a fluid under pressure, preferably air, for moving the carriages. Since this case shows the same system and additions thereto for alternatively operating the machine as disclosed in the parent case or as enlarged in scope by having mounted thereon the attachment specifically covered by this case, description of the entire operating system will be deferred for the present.

Figures 8, 9, 10:
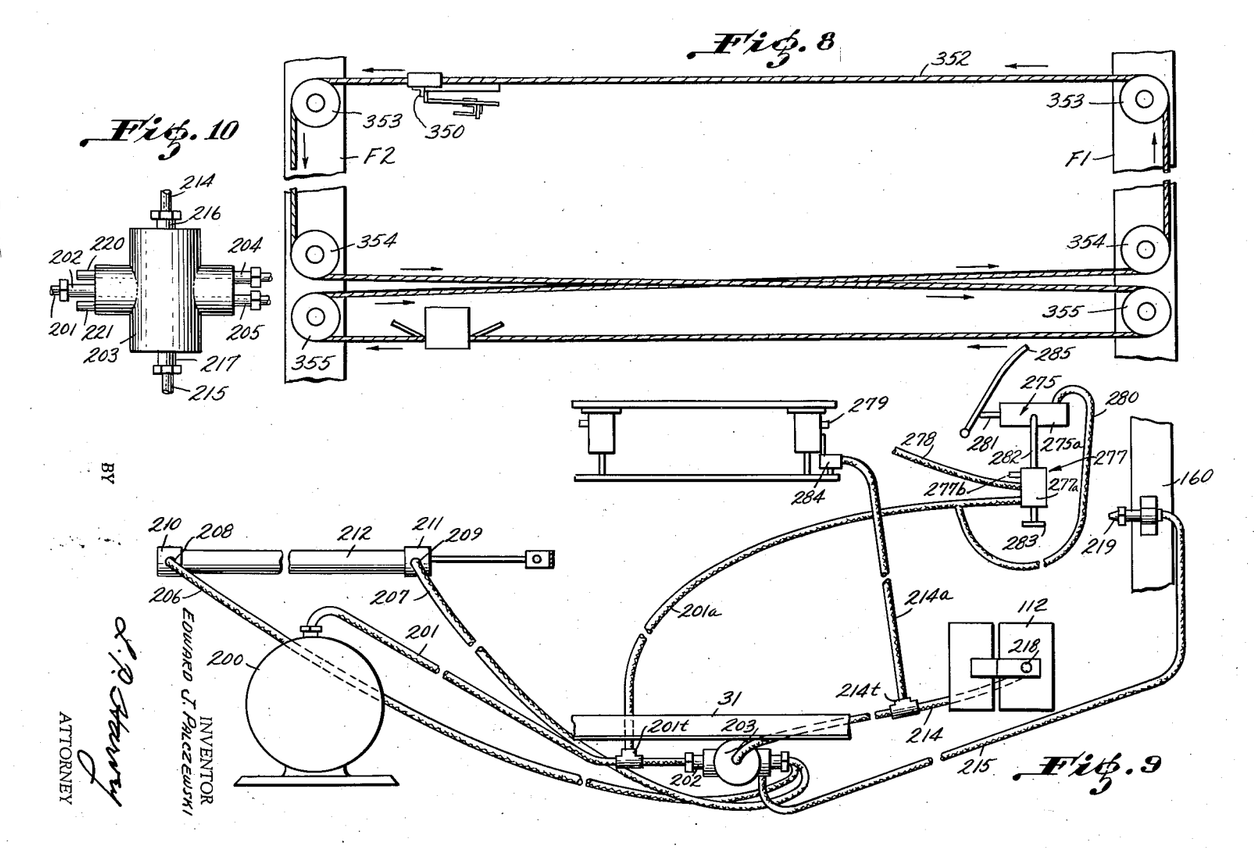
Fig. 8 is a view showing schematically how the squeegee conveying carriage and the drum conveying carriage are connected together by a pulley and cable arrangement, by means of which both carriages are caused to move equal distances and simultaneously in the same direction.
Fig. 9 is a view diagrammatically showing the conduit arrangement for supplying fluid under pressure to various parts of the device, shown in Fig. 6 but modified to take care of the requirements of the machine when the attachment is applied thereto.
Fig. 10 is a view showing a control element incorporated in the conduit arrangement.
Figures 11, 17:
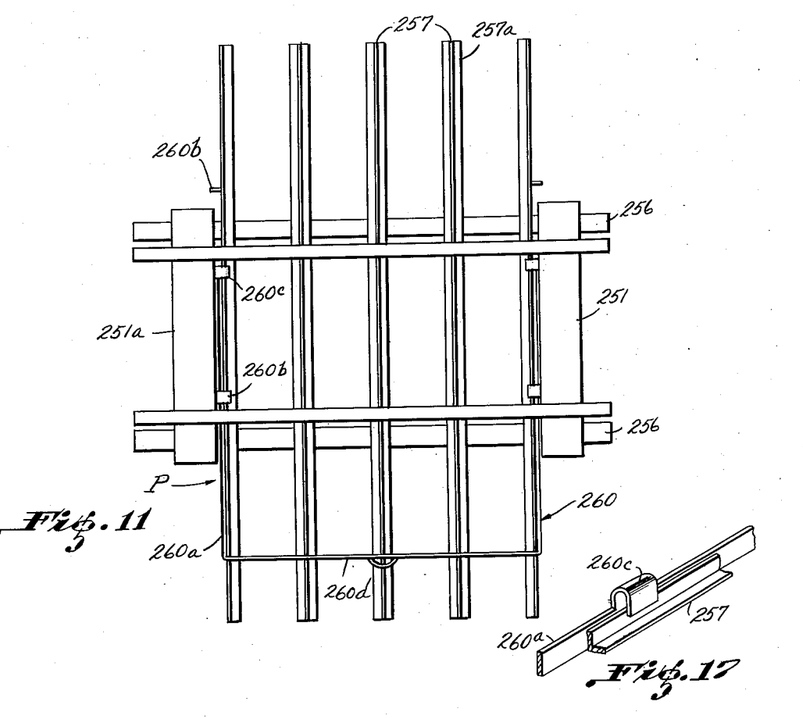
Fig. 11 is a plan view of the attachment, looking down at the same.
Fig. 17 is a detail view showing how a leg of the pusher device is connected to one of the guides on the platform.
Figure 12:
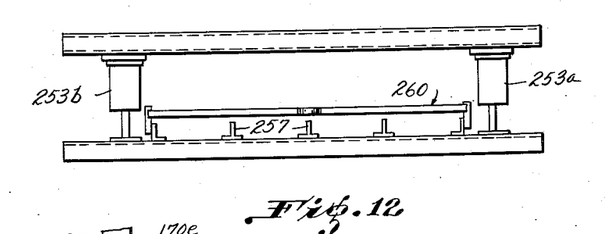
Fig. 12 is a view of the attachment looking at the can receiving part of the attachment.

My earlier filed application discloses a telescopic connection between the squeegee carriage and the drum carriage as the means considered the most desirable, at the time of filing said case, for causing movement of either carriage to cause an equal and simultaneous movement of the other carriage in the same direction. However, it was brought out in said case that a pulley and cable arrangement could be substituted for the connection specifically described in said earlier filed case. Since the use of the telescopic connection would limit the size of the platform of the attachment to be described hereinafter, the cable and pulley arrangement shown in Figs. 1 and 8 is now considered the most desirable.

Figure 3:
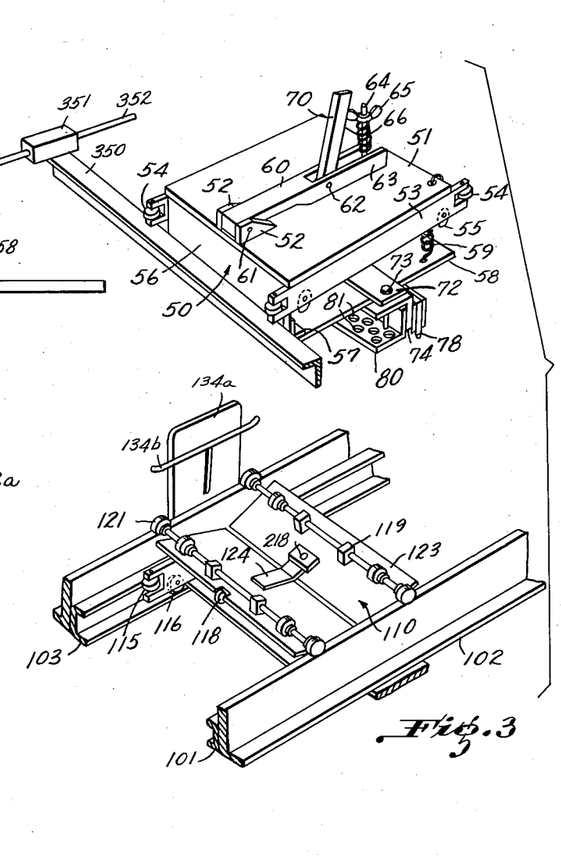
Fig. 3 is a diagrammatic view showing the squeegee and its carriage and the drum conveying carriage and the part of the original machine along which the carriage last mentioned moves.

Referring to said figures and also to Fig. 3, it will be seen that a bar 350, preferably but not necessarily angular in cross section, is secured to wall member 56 of the squeegee carriage. Said bar carries, preferably at each of its ends a rope clamp 351, in which the central portion of a cable or an end of each of two cables is secured. Fig. 8 discloses two cable sections 352, which may be parts of the same cable, as extending in opposite directions from a clamp. Each section is trained over a pulley 353 located near the top of one of the upright members of an end frame, then extends partly around and under a pulley 354 located on the same upright member and then passes around a pulley 355, located on an upright member of the other end frame, to the drum carriage, to which it is secured, preferably to the base plate of the latter. The cable and pulley arrangement may be restricted to either side of the machine, but is preferably used at both sides. Obviously movement imparted to either carriage will cause a corresponding movement of the other carriage. The bar 350 is secured to wall member 56 at a level low enough to prevent engagement of the bar with the channel elements 11 and 12 during movement of the squeegee carriage.

The attachment to be secured to the machine as the latter is disclosed in the first filed application, Ser. No. 366,583, is made up of an upper frame, a lower frame or platform and telescopic suspension devices connecting the latter to the upper frame.

The upper frame is made up of two channel members 250, 250a, the channels of which open toward each other, and a pair of stringer members 251, 251a secured to the lower flanges of said channel members to form therewith said upper frame. The web of channel member 250a is pivotally connected at 250b to one of the flanges thereof, preferably the lower one, so as to facilitate the application of the attachment to the silk screen or stencil frame holders. A bolt 252 is threaded through the upper flange of member 250a and, when the attachment is in use, it is also threaded into an opening in the adjacent frame support.

Figure 13:
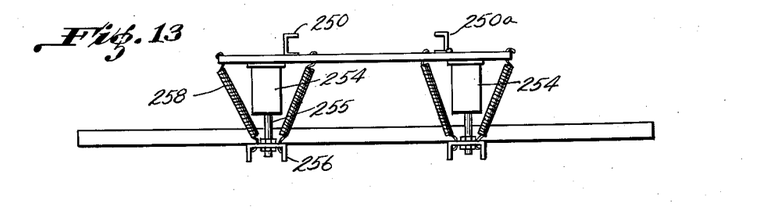
Fig. 13 is a view of the attachment looking at the same from the right of Fig. 12.

A set 253 of telescopic suspension members connects the stringers of the upper frame to the platform P. The upper elements, 253a, 253b, 253c, 253d, of said set consist each of a hollow member 254 (Fig. 13). From each of these a plunger 255 projects. Each plunger is connected to one of the stringers 256 of the platform near a corner thereof. Flanged parallel guide members, the inner ones of the set being in the form of inverted T's, are connected to and spaced along the stringers to form guide channels for the containers to be marked in the operation of the attachment, the lower flanges 257a of the guide members 257 forming supports for the containers as they move through the channels. Springs 258 are secured, preferably in pairs, to the stringers of the upper and lower frames and raise the platform to bring the containers thereon into contact with the panel of the silk screen or stencil structure, when the working medium ceases to operate the suspension devices.

A pusher device 260, U-shaped in edge view has the legs 260a, secured to the outer sides of the outermost guides of the set. Stops 260b on the guides cooperate with stops 260c on the legs of the pusher to limit the travel of the latter in each of the two directions in which it moves. The bight 260d of the pusher member is straight and, in use, engages the bottoms of the set of containers last placed on the platform and moves the containers to positions in register with the permeable portions of the silk screen or stencil. The pusher member also operates, through unmarked set of containers, to push the most recently marked containers toward the exit portion of the platform.

Figures 14, 15:
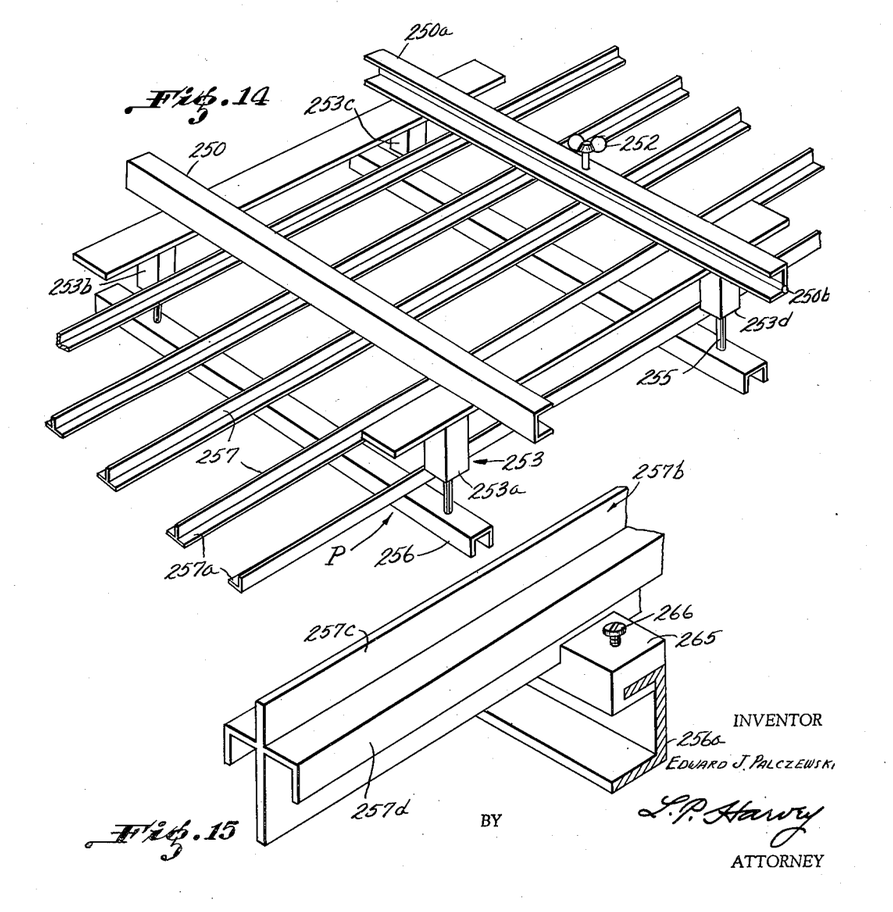
Fig. 14 is a perspective view of the attachment.
Fig. 15 shows a modification in which the can guides are formed and secured to the stringers carrying the same in a special manner.

Fig. 15 shows a modification of the platform already described, in which channeled stringers 256a are used to support the guide members 257b. The latter consist each of a central element 257c, from the opposite sides of which wings 257d, preferably angular in cross section, project. Each central element has a portion near each end thereof secured in a slot in a channeled block 265, slidably and removably secured to an upper flange of one of the channeled stringers. A set screw 266 is threaded through the upper flange of each block and is engageable with the upper flange of the stringer on which the block rides to maintain the associated guide in desired position. This modification presents the advantage that the number and spacing of the guides may be varied to meet changes in the demands made upon the machine in the marking of sets of containers which differ from other sets in the matter of size and shape. Furthermore, use of channeled stringers and blocks of the character just described permits the make up of the platform to be changed through the use of appropriately shaped guides, to take care of containers that may each have but one flat side, or even several flat sides, but are not rectangular in cross section.

To permit the pneumatically operated system for moving the squeegee and drum carriages, which is disclosed in the parent case No. 366,583, to operate the attachment also, the system is modified by the addition thereto of certain elements to be described and the hollow members of the set of telescopic suspension devices are connected by conduit sections one to another and to the modified system to serve as cylinders of the platform depressing structure, while the plungers 255 form the pistons thereof.

The pneumatically operated system, as modified, includes the receiver or air tank 200 of an air compressor-receiver unit for supplying air under pressure. A flexible conduit 201 leads therefrom to the inlet nipple 202 of a reversing valve casing 203, which is fixed to one of the members 31, 32 near the front end of the machine. Air under pressure is conducted alternately from nipples 204, 205 of said casing through flexible conduits 206, 207 to the inlets 208, 209 in cap members 210, 211, which close the ends of cylinder 212. Cap member 210 is pivotally mounted on an angle member connecting the front ends of angle members 31, 32. A piston rod, having a piston head, not shown, in said cylinder projects therefrom through cap 211 and is secured to angle member 213 carried by the base member of the drum carriage as shown in Fig. 6. Flexible conduits 214, 215 extend from nipples 216, 217 respectively of casing 203. Conduit 214 is connected to a spring loaded valve structure 218 carried by the kickoff device of rear wing 112, while conduit 215 is connected to a spring loaded valve structure 219 carried by the plate 160' connecting the rear ends of the floating track members. Exhaust nipples 220 and 221 project from casing 203.

Incorporated in the lines 201 and 214, respectively, are T-shaped valved fittings 201t and 214t, to the first of which a flexible conduit 201a is connected, while a flexible conduit 214a is connected to fitting 214t.

Conduit 201a is connected directly to casing 277a of valve structure 277 and, through a branch conduit 280, to valve casing 275a of valve structure 275.

A set of pipe sections 279 (Fig. 16), connects the hollow member 253a with hollow members 253b and 253d and also connects hollow members 253b and 253c. The valve structure 277 is connected to said set of pipe sections by a conduit 278.

Valve casing 275a is mounted on channel member 250 of the attachment and projecting from said casing is a plunger 281. A conduit 282 connects the valve casings 275a and 277a and from the latter a headed plunger 283 projects. Valve casing 277a is mounted on stringer 251 at the front end, which projects forwardly from the point of attachment thereof to channel member 250.

An exhaust valve structure 284 is mounted, preferably adjustably, on one of the sides of hollow member 253c and projecting from the bottom of the exhaust valve casing is a plunger in position to be reached by one of the platform stringers, when the platform is raised by springs 258. The conduit section 214a connects exhaust valve 284 to T-shaped fitting 214t.

A trip element 285 is also mounted on channel member 250 in position to be depressed by engagement with bar 350 to force plunger 281 inwardly with respect to valve casing 275a.

In one side of the valve casing 277a is located an exhaust port 277b.

The operation of the structure thus described is as follows, assuming that the attachment is not in use and that the machine as disclosed in the first case is used to mark drums.

The rack 150 will be filled with a set of drums and the first drum will roll on to the drum carriage. The latter will be at the drum receiving end of the framework F prior to this time, because the valve 218 can not be opened unless engaged by a drum and consequently lines 207 and 214 and the space, in cylinder 212, between the piston head therein and cap 211 can not be vented. However, when the drum engages the plunger of valve 218, said plunger is depressed, said line or conduit 214 is vented and the movable element in casing 203 places line 207 and the space in said cylinder, which space has just been mentioned, in communication with one of the exhaust nipples of casing 203, thus venting line 207 and the aforementioned space in cylinder 212. At the same time, air flows from receiver 200, through line 201, casing 203 and line 206 into cylinder 212 and operates the piston and piston rod to move the drum carriage and squeegee carriage toward the frame F2. Withdrawal of roller 118 from contact with the bell crank lever allows the arm 164 and roller 165 to rise and prevent further passage of drums off rack 150. Movement of the squeegee carriage causes link 70 to engage the adjacent trip 87 and be swung about pivot 62 and the squeegee is depressed into contact with the panel of the silk screen structure. Contact of the drum with the frame members of said silk screen structure due to the pressure of springs 95 on the floating tracks causes the drums to rotate, as they travel through the machine, and thus present new surface portions to be marked to the liquid medium extruded through the panel.

As the squeegee and drum carriages approach frame F2, link 70 will engage the second trip 70, and the squeegee will be momentarily raised to some extent. However, this will have no appreciable effect on the drum marking operation, since the squeegee will have cleared the permeable portions of the silk screen or stencil panel. On the other hand, as the drum carriage approaches frame F2, rollers 121 enter rear depressions 104, the rear wing 112 is swung downwardly by springs 117 acting thereon and kickoff member 124 expels the drum from the carriage onto the rack 170 for removal from the machine. If the arrangement shown in Fig. 18 is used, the drums leaving the drum carriage will of course roll off members 170c onto the curved ends of members 40a and return to the entrance end of the machine.

When the bottom plate of base member 111 finally engages and opens valve 219, line 215 will be vented and the shiftable element in casing 203 will be moved to vent conduit 206 and the space, in cylinder 212 between cap 210 and the piston head, through casing 203 and the other one of the exhaust nipples of the latter, and meanwhile air will flow from receiver 200, through conduit 201, casing 203, conduit 207 into cylinder 212 to retract the piston rod and move the drum carriage, and consequently the squeegee carriage, toward frame F1. During this last mentioned travel of the latter carriage, the link 70 engages the adjacent trip 87 and is swung about pivot 62, raising the squeegee and permitting it to ride clear of the silk screen panel, until the position of the linkage is reversed by the other trip 87, on the next passage of the carriages through the machine. When the drum carriage finally reaches the limit of its forward movement, roller 118 trips the bell crank and starts a new cycle of operation, if the rack 150 still carries any drums thereon.

Figure 18:
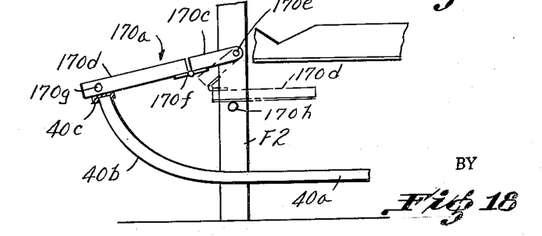
Fig. 18 is a view showing a modification of the machine originally disclosed.

In Fig. 18 is shown a modification which makes it possible to dispense with an attendant at the discharge end of the machine. In this modification, the elements 41, 42 of the pair 40 are replaced by a pair of angle members 40a which extends beyond frame F2 and curve upwardly, as shown at 40b. The upper extremities are connected, for instance, by a channel member 40c, on which the ends of the modified rack 170a may rest, when the machine is operated with an attendant at the discharge end. This rack is made up of two pairs of elements 170c, 170d, arranged with one pair pivotally connected to each upright member of frame F2 at 170e. The outer ends of the pairs are connected by a cross bar 170g and the members of each pair are connected by a hinge 170f.

When the rack is arranged as shown in full lines, drums discharged from the drum carriage will roll down the rack and be removed from the machine at the usual discharge end thereof. However, the rack may be swung upwardly about pivot 170e and then folded about the hinges 170f and the members 170d brought to rest on bar 170h connecting the upright members of the frame F2. With the rack thus folded and arranged, drums discharged from the drum carriage will roll down members 170c onto the curved ends of members 40a and travel to the front of the machine.

While the drum and squeegee carriages in the arrangement disclosed in this case are connected by the pulley and cable structure shown, nevertheless part of the telescopic connecting structure shown in the parent case has been retained in the arrangement herein disclosed to provide drum guides to direct the drum in their passage onto the drum carriage. These guides are made up of side elements 134a secured to the carriage and the directing members 134b carried by the side members.

When the attachment is to be used, conduits 201a and 214a, which are flexible, are connected to the valved fittings 201t and 214t respectively. The web of channel member 250a is swung about the hinge 250b to clear the channel member 21 and the attachment is then applied to channel members 21, 22. The member 250a is then adjusted to place the upper flange thereof across channel member 21 and bolt 252 is then threaded into an underlying opening in the upper flange of said channel member.

The T-fittings 201t and 214t may be provided with hand operated valves or with valves spring loaded to be opened by the act of connecting the respective conduits therewith. If desired, conduits 201a and 214a may be permanently connected to valved fittings mounted on frame F1, for instance, and these fittings may be detachably connected one to valve structures 275 and 277 and the other to exhaust valve 284 carried by member 253c.

In the arrangement as shown, valve structure 277 is in constant communication with line 201, as long as conduit 201a is connected to T-fitting 201t and valve structure 275 is in constant communication with conduit 201a through line 280. If line 201a be connected to a valved fitting permanently mounted on frame F1, then valve structures 275 and 277 would be detachably connected with such fitting. Line 214a would then be permanently connected to a fitting on said frame and exhaust valve 284 would be detachably connected to the last mentioned fitting.

Assuming that the attachment is mounted on channel members 21, 22 and that a silk screen or stencil device is properly mounted in said channels, the drum and squeegee carriages will be at the front end of the machine with roller 118 engaging arm 166 of the bell crank. However, since there will be no drums on rack 150, valve 218 will not be opened to initiate a trip of the carriages toward frame F2. Furthermore, plunger 283 will be in its outermost position with respect to valve casing 277a and consequently conduit 201a will be in unrestricted communication with the set 253 of hollow members and exhaust port 277b will be cut off from said set. As a result, the platform P will be held in its lowermost position. Pusher 260 is then drawn fully forward, a container is then placed in each guide channel of the platform and the pusher is operated to aline the containers in position to receive marking medium extruded by the squeegee. The operator of the machine then depresses plunger 283 and the system of hollow members and conduits shown in Fig. 16 is vented through casing 277a and exhaust port 277b. This permits springs 258 to raise platform P to put the containers thereon in contact with the panel of the silk screen or stencil device. As the platform rises, valve 284 is opened by the engagement of the adjacent stringer of the platform and lines 214, 214a are vented. In so far as the movements of the drum and squeegee carriages and the operation of the squeegee structure are concerned, venting of conduit 214, whether it be through valve 218 or exhaust valve 284, produces the same result, i.e. the fluid under pressure acts to move the carriages toward frame F2, with the squeegee in wiping contact with the permeable portions of the panel of the silk screen or stencil device, the drum carriage eventually opens valve 219, the carriages return to their original stations with the squeegee riding clear of said permeable portions. However, when the attachment is mounted on the machine, on the return trip of the squeegee carriage toward frame F1, bar 350 will engage trip 285 and depress plunger 281 and valve structure 275 will perform its only function, i.e. it will supply fluid under pressure to valve casing 277a and project plunger 283 to its outermost position. Fluid under pressure will now be supplied to the set of telescopic members, the platform will be depressed and the apparatus will be conditioned for a new cycle of operations such as has just been described.

It will become apparent upon consideration of the foregoing description that the apparatus as disclosed is susceptible of obvious modifications. For instance, the hollow members of the set 253 might take the form of solenoids operating on the plungers 255, with the valve structures 275, 277 replaced by suitable switches, especially when the pneumatically operated system is replaced by electrical equipment for moving the carriages. The hollow members of the set 253 might be secured to the platform P and the plungers 255 secured to the upper frame. The springs 258 might be replaced by springs located within the hollow members or springs 258 might take the form of compression members arranged to lower the platform and the hollow members and plungers arranged to raise it against the action of such springs. Furthermore, the members 250, 250a might be simple channel members resiliently mounted on the stringers of the upper frame for the limited movement toward each other so as to facilitate the mounting of the attachment on the channel members 21, 22 or they might take the form of a plurality of the separate clasps for embracing said channel members.

Furthermore, the attachment may be used to mark flat areas of containers which may otherwise be cylindrical but which could not very well be handled by the original machine, i.e., the machine to which the attachment is applied.

Accordingly the claims which follow have been drafted to include the obvious modifications of the structure as disclosed in the specification and drawings.

I claim:

1. A structure including in combination a machine for marking the cylindrical portions of drums having such portions, an attachment removably applied to said machine for presenting containers having flat side wall portions in positions for the marking by the machine of such side wall portions, and means for operating said machine to cause such marking; said machine including a framework having oppositely disposed end frames, an upper set of parallel members, an intermediate set of parallel members and a lower set of parallel members, said sets of members extending through the space between said end frames, the uppermost of said sets comprising a pair of track members, the intermediate set comprising a plurality of supports for removably receiving the framing of silk screen or stencil structure to be carried by said set and the lower set comprising a pair of track members; said machine also including a squeegee structure, having a carriage mounted for reciprocation in the tracks of said upper set, a squeegee supported by said carriage and means for depressing said squeegees into wiping relation with the paneling of silk screen or stencil structure carried by said intermediate set or removing said squeegee from such wiping relation; said machine further including a drum conveying carriage, mounted for reciprocation along the tracks of said lower set, for presenting drums to be marked in position to receive marking medium extruded through such paneling, and means connecting said carriages together to cause movement of either carriage to produce equal simultaneous movement of the other carriage in the direction of the moved carriage; said attachment including the combination of a frame, a platform, and telescopic means suspending said platform from said frame; said frame including members, internally contoured to embrace the members of said intermediate set, and stringers secured to said contoured members; said platform including stringers and guide means spaced therealong and providing channels for directing containers to be marked; said telescopic suspending means including a set of hollow members and a set of plungers projecting therefrom and connected one set to said frame and one set to the platform; said means for operating said machine including a hollow member, a plunger projecting therefrom and connected to one of said carriages, and means for supplying a working medium to the last mentioned hollow member.

2. A structure of the type defined in claim 1, in which the sets of parallel members connect the end frames together.

3. A structure of the type defined in claim 1, which includes means connecting the telescopic members to said means for supplying working medium and in which the telescopic members include means for operating said plungers for moving the platform from an original position to vary the spacing of the same from the paneling of the silk screen or stencil structure.

4. A structure of the type defined in claim 1, in which the guide members of said platform include flanges constituting the supporting means for the containers to be marked.

5. A structure of the type defined in claim 4, in which the guide means are slidably and removably mounted on the stringers of the platform and in which means are provided to hold the guide means in selected positions on the stringers of the platform.

6. A structure of the type defined in claim 1, in which the attachment includes a pusher member, movable with respect to said platform from one position near the container receiving port thereof to a second position rearward of the first position, and in which the pusher member includes a straight portion arranged to aline containers to be marked in register with the normal positions of the permeable portions of the paneling of the silk screen or stencil structure when the pusher member is in its rearmost position with respect to the platform.

7. A structure of the type defined in claim 1, in which the attachment includes means for urging the platform toward its original position.

8. A structure of the type defined in claim 1, in which contoured members form a pair of parallel channel members and the web portion of one channel member is rigid with one of the flanges thereof and is hingedly connected to the other flange.

9. A structure of the type defined in claim 8, in which a bolt is threaded through said one flange into the adjacent member of the intermediate set.

10. A structure of the type defined in claim 3, in which each hollow member and the plunger projecting therefrom constitute the cylinder and piston of an expansible chamber mechanism for utilizing compressed air as the working medium.

11. A structure of the type defined in claim 10, in which the means for operating the machine includes a control structure carried by the attachment for causing the compressed air to flow to one port of the cylinder of the means for operating the machine to move the carriages in one direction and also includes a control structure, carried by one of the frames, to cause a reversal of the direction of travel of the carriages.

12. An attachment for application to the guides for removably retaining the framing of a silk screen or stencil structure of a machine for marking cylindrical containers to enable the machine to mark containers non-cylindrical in cross section but having each a flat side wall portion; said attachment comprising a set of spaced apart stringers, a set of channel members secured to the stringers adjacent the opposite ends thereof in position to detachably embrace said retaining guides, a platform including stringers and guide members spaced along the stringers to form guide channels for directing containers supported by the platform in their passage from the container receiving portion thereof to the container exit portion thereof, telescopic suspension means connecting said platform to the first mentioned stringers, resilient means for urging said platform to an original position with respect to the first mentioned stringers and means for actuating said telescopic suspension means to move the platform to vary the spacing thereof with respect to the first mentioned stringers.

13. A structure of the type recited in claim 12, including a pusher member slidably connected to the outermost of the guides of the platform to move containers in said guides to positions in which the portions of the containers to be marked are in alinement and properly located to be marked by marking medium extruded from said silk screen or stencil structure.

14. An attachment for application to a machine of the silk screen or stencil printing type; said attachment comprising an upper frame, a lower frame, telescopic suspension devices connecting said frames, resilient means interposed between said frames, and container aligning means carried by one of said frames; said upper frame comprising stringers extending from one end to the opposite end of said frame and a set of clasp members attached to said stringers near the opposite ends thereof to embrace the members used for removably holding the framing of a silk screen or stencil device in said machine; said lower frame comprising a set of stringers and guide members spaced along the stringers to form guide channels for directing containers, having flat side portions, from one end to the opposite end of said lower frame while supported thereby; said suspension devices comprising each a hollow member secured to one of said frames, a plunger projecting from said hollow member and secured to the other frame, and means within the hollow member for moving said plunger; operating medium conducting means connecting said hollow members together and means, carried by one of said frames, for connecting said conducting means to a source of working medium supply to operate said plunger moving means; said resilient means including one or more elements associated with each telescopic device to resist relative movement of the frames by the movements of said plungers; and said aligning being movable toward and away from said one end of the frame carrying the same to move containers through the guide channels from the container receiving parts of the latter to predetermined positions wherein the flat side portions are in alinement and located to receive marking medium extruded through the panel of the silk screen or stencil structure.

15. An attachment of the type defined by claim 14, in which the guide members provide supports for the containers to be moved through the channels of the lower frame.

16. An attachment of the type defined by claim 14, in which the lower frame includes members adjustably and removably securing the guide members to the stringers of the frame.

17. An attachment of the type defined in claim 14, in which the set of clasp members constitute oppositely disposed channeled structure means and the channeled structure means on one side of the set have web and flange portions movable with respect to the channeled structure means on the other side of the set to facilitate application of the attachment to the machine, and means for holding the channeled structure means in fixed relation when the attachment is in operative position in the machine.

18. A structure of the type defined in claim 14, in which the hollow members serve as cylinders and the plungers form piston rods, the piston heads and walls of the hollow members constitute the means for moving the plungers, the means connecting the hollow members are made of tubing and the means for supplying working medium to said connecting means include a conduit section and control structure carried by the upper frame for governing the flow of a fluid operating medium to said tubing.

19. A device for marking containers having cylindrical side portions; said device comprising a framework having spaced apart end frames, a set of guide members extending through the framework at the upper portion thereof; a squeegee structure, including a carriage, supported by said set for movement through the space between said end frames; a set of support members, for removably holding the framing of a silk screen or stencil structure, and extending through said space between the end frames at a level below the level of the first set of members; a set of track members extending through the space between the end frames at a level below the level of the second set of members; a carriage for conveying drums to be marked through the framework in marking medium receiving relation to a silk screen or stencil structure held in said set of support members, said carriage being movably mounted on said set of track members; means connecting said carriages together to cause movement of one to move the other; a set of members extending through the framework, at a level below that of said track members, from one end frame to and through the other end frame and curved upwardly beyond the latter; means connecting the extremities of the upwardly curved portions of the last mentioned members; a rack in position to have discharged thereon containers transported through the framework from said one end frame, said rack comprising oppositely disposed pairs of members, the members of each pair being hinged together to move into alinement with each other with one member resting on the means connecting the extremities of said upwardly curved portions, the other member of each pair of rack members being pivotally connected to said other end frame; and a support carried by said other end frame at a level below the pivotal connection of said other rack members to said other end of frame; said rack being foldable to be held by said support out of the path of travel of drums discharged from the drum carriage onto the upwardly curved portions of the members of the last mentioned set.

References Cited in the file of this patent

UNITED STATES PATENTS

| | | |
|---|---|---|
| 2,061,679 | Simonton | Nov. 24, 1936 |
| 2,383,947 | Wensel et al. | Sept. 4, 1945 |
| 2,558,674 | Fischer | June 26, 1951 |
| 2,588,878 | Reemelin et al. | Mar. 11, 1952 |